United States Patent [19]
Yoshihara

[11] Patent Number: 6,003,539
[45] Date of Patent: Dec. 21, 1999

[54] DIFFERENTIAL PRESSURE REGULATING VALVE AND LIQUID SHUT-OFF VALVE DEVICE

[75] Inventor: Koichi Yoshihara, Fujisawa, Japan

[73] Assignee: NOK Corporation, Tokyo, Japan

[21] Appl. No.: 09/233,330

[22] Filed: Jan. 20, 1999

[30] Foreign Application Priority Data

Jan. 20, 1998 [JP] Japan .................................. 10-022582

[51] Int. Cl.$^6$ .................................................. F16K 24/04
[52] U.S. Cl. ........................... 137/202; 137/43; 137/510; 137/587
[58] Field of Search .............................. 137/43, 202, 510, 137/587

[56] References Cited

U.S. PATENT DOCUMENTS

5,529,280  6/1996  Satoh et al. ........................... 251/61.1
5,598,870  2/1997  Nagino ................................. 137/202 X
5,640,993  6/1997  Kasugai et al. .......................... 137/587

*Primary Examiner*—Gerald A. Michalsky
*Attorney, Agent, or Firm*—Jacobson, Price, Holman & Stern, PLLC

[57] ABSTRACT

A differential pressure regulating valve is disclosed which improves sealing performance when the valve closes. The differential pressure regulating valve has a diaphragm and a guide. The guide limits the moving direction of a retainer. A projecting part and an engaging hole engage with one another and reduce deformation of the diaphragm by tolerating a relative movement between the diaphragm and the retainer. A liquid shut-off valve device is also disclosed which incorporates the differential pressure regulating valve and has stable operating characteristics.

5 Claims, 6 Drawing Sheets

DIFFERENTIAL PRESSURE REGULATING VALVE AND LIQUID SHUT-OFF VALVE DEVICE

BACKGROUND OF THE INVENTION

1. Technical Field of the Invention

The present invention relates to a liquid shut-off valve device provided for, for example, a fuel tank of vehicle or the like and a differential pressure regulating valve provided for this liquid shut-off valve device, and relates to a technology for improving a sealing performance of the differential pressure regulating valve.

2. Related Art

Figure 4:
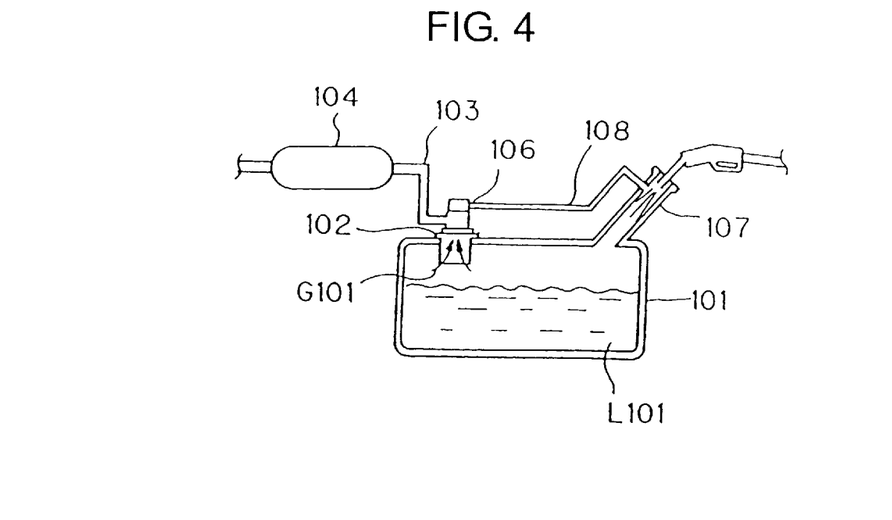
FIG. 4 is a drawing of a conventional liquid shut-off valve device which is mounted on the fuel tank.

As this kind of a liquid shut-off valve device, there has been, for example such one mounted on a fuel tank 101 of a vehicle as shown in FIG. 4.

Namely, this liquid shut-off valve 102 is arranged on an upper part of the fuel tank 101, and makes air and fuel vapor G101 in the fuel tank 101 flow into a canister 104, etc. absorbing fuel component of the fuel vapor 101 through an exhaust line 103 at a time of fueling, and prevents the fuel vapor G101 from being made to flow back to a filler port and exhausted therefrom into the atmosphere.

Moreover, when a liquid level of the fuel L101 is raised by, for example, fueling or swinging of a vehicle or when the vehicle is tilted or overturned, this liquid shut-off valve device 102 has a liquid shut-off function to prevent the fuel L101 from leaking out of the exhaust line 103.

Figure 5A:
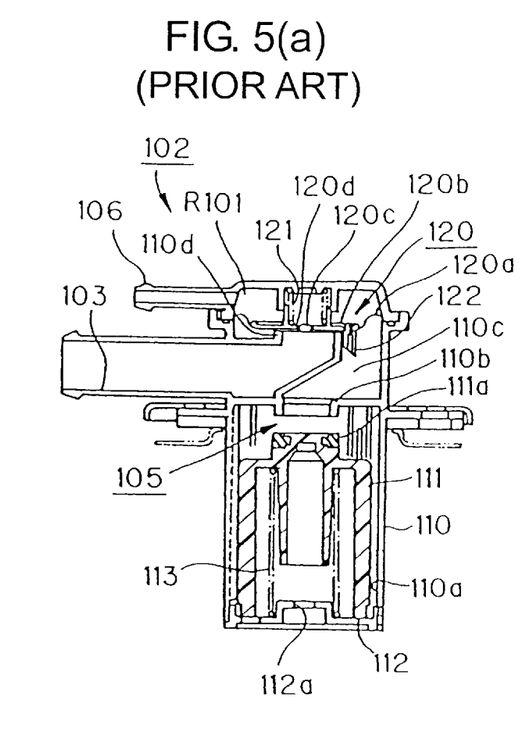
FIGS. 5(a) and 5(b) are drawings of a conventional liquid shut-off valve device.
Figure 5B:
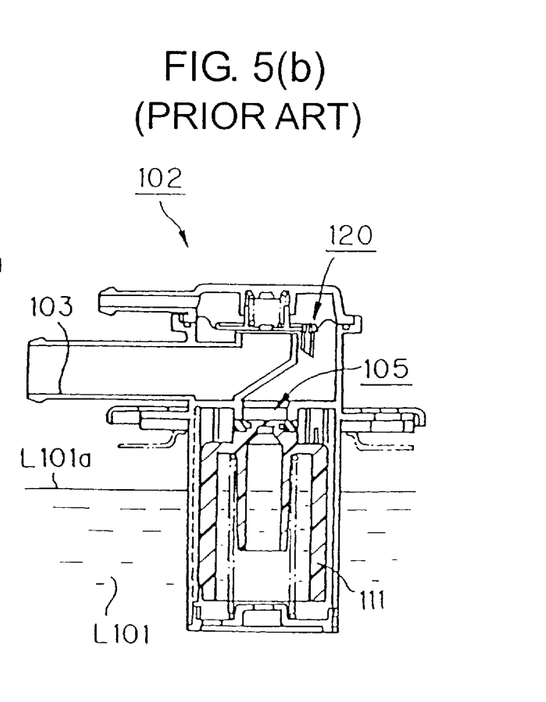

FIGS. 5(a) and 5(b) are a cross-sectional configuration views for illustrating the constitution and its function of the liquid shut-off valve device. FIG. 5(a) shows a state allowing the fuel vapor G101 to be exhausted without exerting the liquid shut-off function, and FIG. 5(b) shows a state in which the level of the fuel L101 is raised and the liquid shutoff valve device 102 closes the valve by operating the liquid shut-off function.

In both Figures, reference mark 110 is a case member, of which an inner part is a float chamber 110a for housing a float 111. The float 111 generates a buoyant force by the fuel L101 made to flow into the float chamber 110a from a communicative hole 112a of a cap 112 mounted on a lower end of the case member 110, and is moved upward in the state of these figures.

A ring form of a sealing valve body 111a exerting a sealing performance is provided on a top portion of the float 111, and a valve seat part 110b corresponding to the valve body 111a is provided on a top portion of the float chamber 110a. Here, a valve constituted by the valve body 111a and the valve seat part 110b is defined as a float valve 105.

Moreover, reference mark 113 is a spring performing a function as an biasing means for adjusting the buoyant force of the float 111. This spring 113 is always biasing the float by a weight smaller than own weight of the float 111 and does not push up the float to shut the float valve 105 at the time there is no buoyant force in the normal condition.

The valve seat part 110b is arranged at one end of a vent part 110c, and a valve seat part 110d, to which a differential pressure regulating valve 120 is to be abutted, is open at the other end of the vent part 110c.

Therefore, an exhaust path is configured, for exhausting the fuel vapor G101 from the valve seat part 110b to the vent part 110c, and further to the exhaust line 103 via the differential pressure regulating valve 120.

Since the differential pressure regulating valve 120 is opened by an inner pressure of the fuel tank 101, in order to introduce a pressure equivalent to the atmospheric pressure (or a negative pressure) into an operating chamber R101, and operating chamber 101 is provided with a filler port 106 which is connected to a filler tube 107 (fuel filling part) via a filler line 108 (refer to FIG. 4).

And, in a state in which a differential pressure is small between a pressure in the fuel tank 101 and that in the operating chamber R101, since the differential pressure regulating valve 120 is biased by the spring 121 in the direction of opening the valve, it closes the valve seat part 110d, and when the differential pressure becomes a predetermined value or higher at a time of fueling and the like, the valve is opened to make the fuel vapor G101 flow out into the exhaust line 103.

The differential pressure regulating valve 120 has a diaphragm 120a of a rubber like elastic body, a retainer 120b being abutted to the diaphragm 120a for holding the form, and an orifice plug 122.

The diaphragm 120a and the retainer 120b are tightly fixed to each other by such a way as a projecting part 120c formed in the center part of the diaphragm 120a is engaged in an engaging hole 120d of the retainer 120b.

The orifice plug 122 has an orifice allowing a small flowing flow to communicate between the inside of the fuel tank 101 and the operating chamber R101, and is attached so as to hold the diaphragm 120 with the retainer 120b.

And, the orifice eliminates a differential pressure between those of the operating chamber R101 and the inside of the fuel tank 101 in a predetermined time to maintain a closing valve characteristic of the differential pressure regulating valve 120, or permits to exhaust the fuel to the side of the fuel tank 101 by a small amount when the fuel L101 is made to flow into the operating chamber R101.

Here, the reason for the connection between the operating chamber R101 and the filler tube 107 is to make the fuel vapor G101, which passes through the orifice 122 and the pressure film of the differential pressure regulating valve 120 (the fuel vapor G101 sometimes passes through the pressure film in a case, etc. that the pressure film is configured of a thin film comprising of a rubber elastic body), to be not directly discharged into the atmosphere, and to generate a differential pressure between the operating chamber R101 and the inside of the fuel tank 101 by making use of a negative pressure generated in the filler tub 107 at the time of fueling.

Moreover, a filler port which is an opening end of the filler tube 107 is normally closed with a cap, and the fuel vapor G101 is made resistant to be discharged out of the filler port by Venturi effect of the fuel L101 filled up at the time of fueling.

Therefore, FIG. 5 (a) shows a state in which the float 111 is stationed at a lower position due to no buoyant force exerted thereon, and when the inner pressure of the fuel tank 101 is raised by fueling, etc., the fuel vapor G101 flows into the vent part 110c from the valve body 111a in an open state and the valve seat 110b and is allowed to flow out into the exhaust line 103 by opening the differential pressure regulating valve 120 due to the differential pressure.

FIG. 5(b) shows such a state in which the liquid level L101a rises due to fueling, etc. and the fuel 101 flows into the float chamber 110a, and the float 111 is floated up to close the float valve 105 and shut off the exhaust line 103.

Then, as the liquid level L101a of the fuel L101 in the float chamber 110a drops, the float 111 also falls and resets the exhaust line 103 and the fuel tank to the normal state in which they are communicating with each other, to open the float valve 105 (the state shown in FIG. 5(a)).

Figure 6:
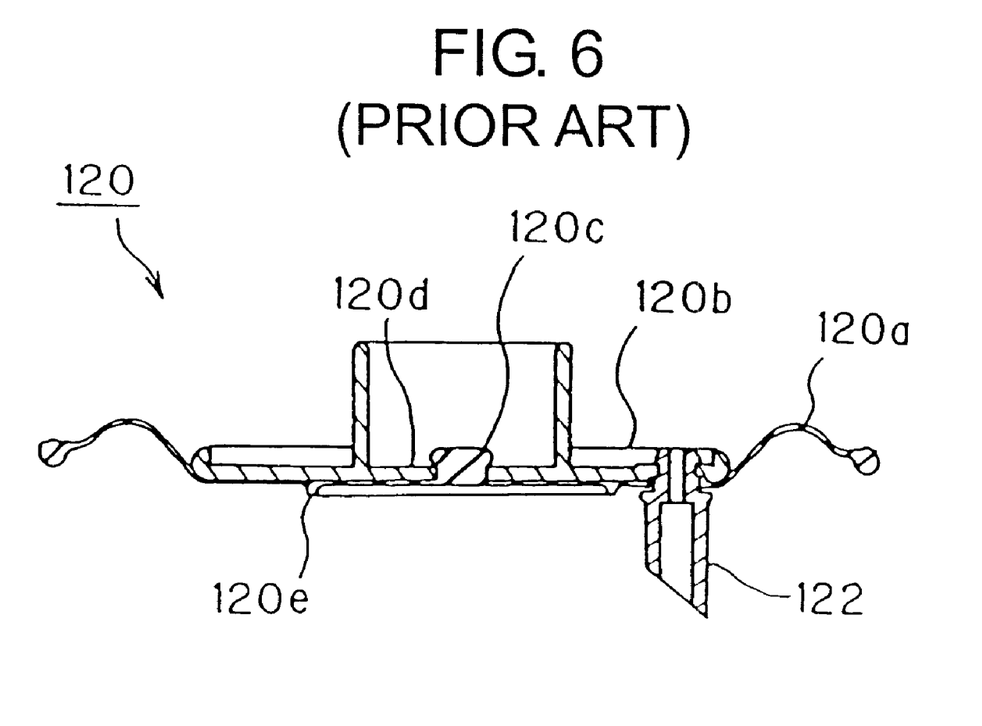
FIG. 6 is a drawing of a cross sectional configuration explaining a conventional differential pressure regulating valve.

FIG. 6 shows an enlarged view of the differential pressure regulating valve 120. In such a liquid shut-off valve device 102, the differential pressure regulating valve 120 is comprised of the three members of a diaphragm 120a, a retainer 120b, and an orifice plug 122 as described above.

However, since the diaphragm 120a is tightly fixed to the retainer 120b at the two points of the projecting part 120c and the orifice plug 122, a misalignment between them slightly brings wrinkles or deformations on a bead part 120e of the diaphragm 120a, leading to a decrease in its flatness and sealing performance at a time of closing the differential pressure regulating valve.

This is because the differential pressure between the operating chamber R102 and the inside of the fuel tank 101 to be set for opening the differential pressure regulating valve 120 of the liquid shut-off valve device 102 is set to a small differential pressure (about 30 mmAq), therefore, a biasing force by the spring 121 is also set to be low, so it is difficult to correct the wrinkles and deformations by the load (a biasing force) of the spring 121 at a time of closing the valve and this fact makes it impossible to bring the bead part into an intimate contact state with the valve seat part 110d, influencing the sealing performance.

Figure 7:
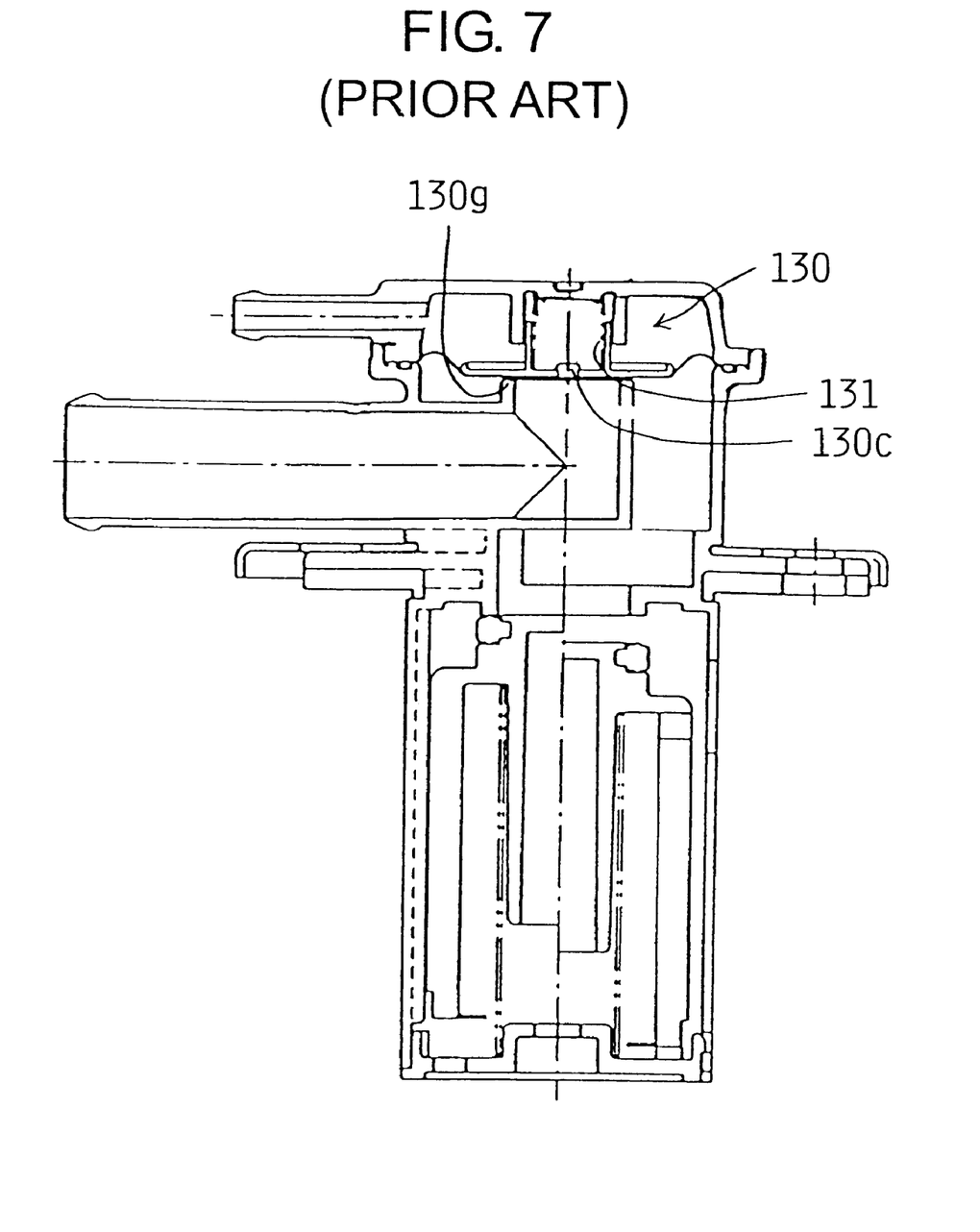
FIG. 7 is a drawing of another conventional liquid shutoff valve device having no orifice.
Figure 8A:
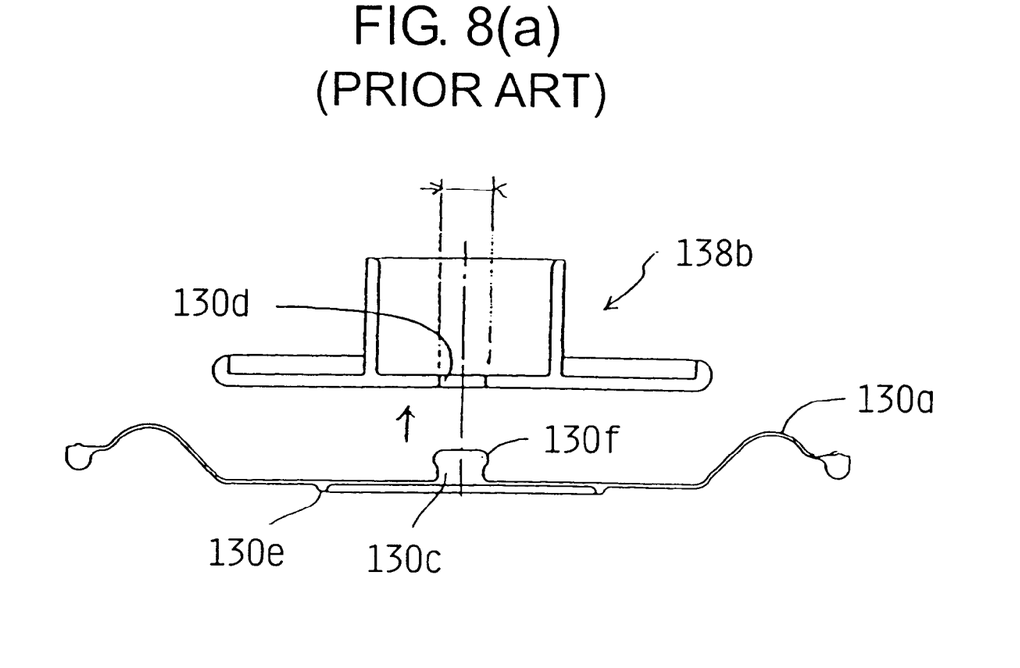
FIG. 8 is a drawing of a cross sectional configuration explaining a conventional differential pressure regulating valve which is used in the valve device in FIG. 7.
Figure 8B:
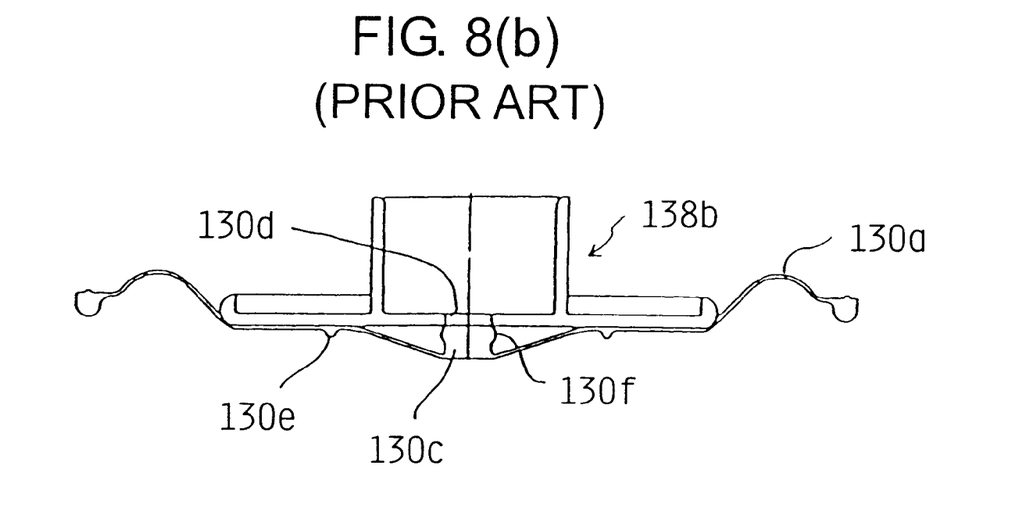

FIG. 7 shows a cross sectional view of an another type of conventional differential pressure regulating valve device without orifice plug. FIG. 8 shows a cross sectional view of the valve part of differential pressure regulating valve which is used in the device of FIG. 7. The diaphragm 130a has a projecting part 130c, which is placed on the center of the diaphragm, with a top bulge 130f formed on the projecting part 130c as shown in FIG. 8(a). The projecting part is inserted and fixed in an engaging hole 130d of a retainer 138b. When interference between the projecting part and the engaging hole is large, small wrinkles tend to appear in a bead part 130e of a sealing portion of the diaphragm, leading to a decrease in its flatness and sealing performance at a time of closing the differential pressure regulating valve. On the other hand, when interference between the projecting part and the engaging hole 130d is small, negative pressure on the canister side causes a tendency of a coming out of the projecting part 130c from the hole of the retainer, and the thus coming out projecting part 130c can not come back easily into the engaging hole because the projecting part can not re-enter into the engaging hole easily due to the difference between in the diameter of the bulge part 130f and in the diameter of the hole (the diameter of the bulge part 130f is larger than the diameter of the engaging hole 130d), as shown in FIG. 8(b). This phenomenon causes wrinkles or deformation on or around the bead part 130e of a sealing portion, leading to a decrease in sealing performance at a time of closing the differential pressure regulating valve.

Biasing force by the spring 131 is set to be low, so it is also difficult to correct the wrinkles and deformations by the load (an biasing force) of the spring 131 at a time of closing the valve and this makes it impossible to bring the bead part into an intimate contact state with the valve seat part 130g, causing a decrease in sealing performance, as mentioned above.

SUMMARY OF THE INVENTION

The present invention has been made for solving the above problems of the prior technology and the objects of the present invention are to improve a sealing performance at a time of closing a differential pressure regulating valve and to provide a liquid shut-off valve device with stable performance characteristics.

In order to achieve the above-mentioned objects, the differential pressure regulating valve according to the present invention is characterized in being provided with a diaphragm of which the peripheral part is fixedly held and which operates in response to a differential pressure between the pressures applied to the front and back faces of the diaphragm, a valve seat arranged opposite to a center part of the diaphragm, a valve body which is assembled with the diaphragm in one body and meets the valve seat or parts from it, an abutting member arranged in the adjacent relation and on an opposite side of the valve body of the diaphragm, a biasing means which energizes the diaphragm via the abutting member and brings the valve body into a closed state, a guide means which limits a moving direction of the abutting member to an approximately same direction as the biased direction, and an engaging means which prevents the diaphragm from being distorted by tolerating a relative move in a direction approximately perpendicular to the direction biased by the biasing means and engages the diaphragm with the abutting means.

Thus, even if the diaphragm is engaged with the abutting member, deformation of the diaphragm is reduced, and it is possible to bring a closed state between the valve body provided on the diaphragm in one body and the valve seat into excellent intimate contact with one another and improve the sealing performance of the differential pressure regulating valve.

Figure 2:
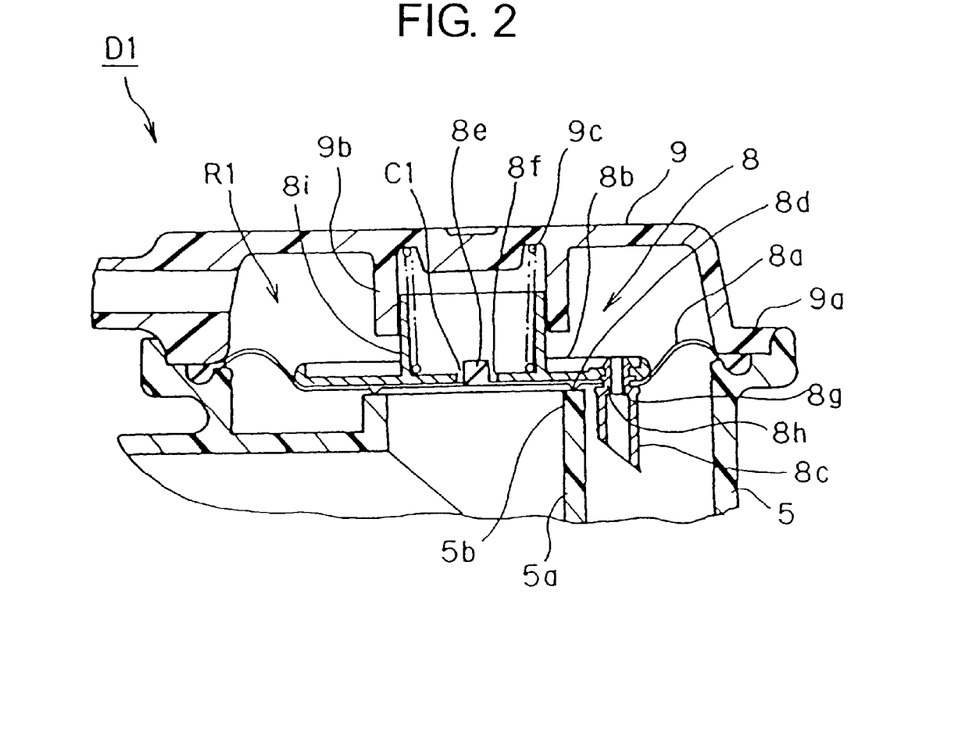
FIG. 2 is an enlarged drawing of the part D1 which shows a differential pressure regulating valve in FIG. 1.

It is also suitable that the engaging means is comprised of the projecting part provided on the diaphragm and the engaging hole of the abutting member in which this projecting part is loosely engaged. Between the projecting part 8e and the engaging hole 8f there is a clearance Cl. The clearance in diameter is in the range of about 0.5 to 2.0 mm, preferably in the range of about 1.0 to 1.5 mm. The shape of the projecting part and the engaging hole have any shape, however, cylindrical and round shape is preferable. The diameter of the projecting part is not limited so long as the projecting part does not have any interference with the spring 9c. Considering the flexibility, manufacturing cost or the like of the diaphragm, preferable diameter of the projecting part is in the range of about 1 to 10 mm. The height of the projecting part is in the range of about 0.5 to 5 mm, preferably in the range of about 1 to 3 mm.

The top bulge on the projecting part, however, can be provided if the diameter of the top bulge is so large enough that the top bulge can not come out from the engaging hole at the time of the presence of negative pressure on the canister side, if the top bulge does not cause material interference with the retainer, and if the clearance Cl is secured.

Moreover, the liquid shut-off valve device according to the present invention is characterized in being provided with an exhaust path which is arranged on a top part of a sealed container containing liquid and through which gas in the sealed container is exhausted, a float valve which is moved by a buoyant force of the liquid in the sealed container and opens/closes the exhaust path, and a differential pressure regulating valve which opens/closes the exhaust path in response to a differential pressure between a the sealed container and an operation chamber into which pressure outside of the sealed container is introduced, comprising, a diaphragm of which the peripheral part is fixedly held and which operates in response to a differential pressure between the front and back surfaces thereof, a valve seat placed opposite to a center part of the diaphragm, a valve body which is assembled with the diaphragm in one body and meets the valve seat or parts from the same, an abutting member disposed in the adjacent relation and on an opposite side of the valve body of the diaphragm, a biasing means for biasing the diaphragm via the abutting member to bring the valve body into a closed state, a guide means for limiting a moving direction of the abutting member to an approximately same direction as the biased direction, and an engaging means which reduces deformations of the diaphragm by allowing a relative move in a direction approximately perpendicular to the direction biased by the biasing means and engages the diaphragm with the abutting means.

Thus, even if the diaphragm is engaged in the abutting member, deformation of the diaphragm is reduced, and it is possible to bring a closed state between the valve body provided on the diaphragm in one body and the valve seat into an satisfactory contact state, and improve the sealing performance of the differential pressure regulating valve and further, improve a liquid shut-off function of the liquid shut-off valve device.

It is also suitable that the engaging means is comprised of the projecting part provided on the diaphragm and the engaging hole of the abutting member in which this projecting part is loosely engaged as mentioned above.

It is also suitable that the engaging means is also preferred to be provided at the orifice plug provided on the diaphragm.

BRIEF DESCRIPTION OF THE DRAWINGS

FIG. 1.

FIG. 2.

FIG. 3.

FIG. 4.

FIGS. 5(a) and 5(b)

FIG. 6.

FIG. 7.

FIG. 8.

DETAILED DESCRIPTION OF THE PREFERRED EMBODIMENTS

The present invention will be described below according to the preferred embodiments as shown in the figures. A liquid shut-off valve device 1 according to a preferred embodiment of the present invention is, similarly to the one described in the item of the Prior Art according to FIG. 4, mounted on an upper part of a fuel tank 101, for example, on an automobile, etc. as a sealed container, and exhausts fuel vapor G, etc. as a gas out of an exhaust line 103 connected with the liquid shut-off valve device 1, while this liquid shut-off valve device has a liquid shut-off function to prevent the fuel L from leaking into the exhaust line 103 when a liquid level of the fuel is raised by, for example, filling liquid fuel or swinging of a vehicle or when the vehicle is tilted or overturned.

Figure 1:
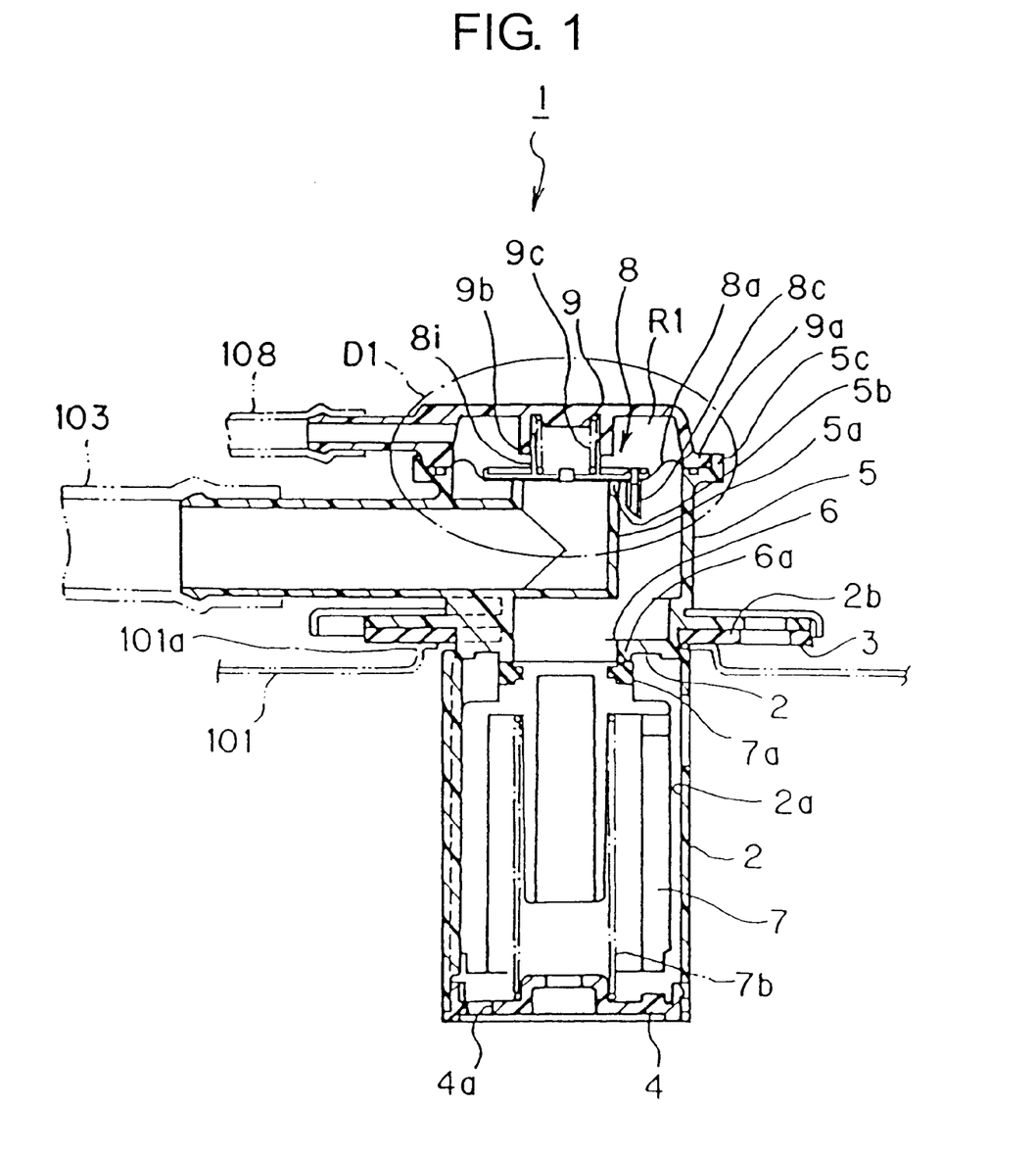
FIG. 1 is a drawing of a cross sectional configuration explaining the liquid shut-off valve device in the preferred embodiment in accordance with the present invention.

FIG. 1 shows a view for illustrating a characteristic configuration of the liquid shut-off valve device in accordance with the present invention, and the description is started with the main configuration of the liquid shut-off valve device 1 referring to this FIG. 1.

The reference mark 2 indicates a lower cylindrical housing as a float chamber 2a, and a flange part 2b is mounted on a mounting hole part 101a provided on a top part of the fuel tank 101 via a gasket seal 3.

On the top part of the lower housing 2, a sealing wall is provided for forming the top part of the float chamber 2a, and on the bottom part of the lower housing 2, a cap 4 is mounted covering the bottom opening end face of the float chamber 2a.

And, an upper housing 5 constituting an exhaust path is coupled to the top of the sealing wall 2c. In the center part of this upper housing 5, an exhaust port 5a connected to an exhaust line 103 is formed as a valve seat 5b at the top part of the exhaust port 5a.

Approximately at the center of the sealing wall 2c, a cylindrical vent part 6 is provided for making the inside of the fuel tank 101 communicate with the exhaust line 103 outside of the fuel line 101, and an end part of this vent part 6 toward the inside of the fuel tank 101 is made as a valve seat 6a. The end part of the vent part 6 toward the outside is open to the inside of the upper housing 5.

Then, the valve body part 7a of the float 7 as a float valve moving upward in the state shown in this figure is abutted on the valve seat 6a by a buoyant force generated by the fuel L being held in the float chamber 2a of the lower housing 2 and flowing in the float chamber 2a through the communicating hole 4a, etc. of the cap. The reference mark 7b indicates a spring for adjusting the buoyant force of the float 7 and biasing the float 7 in the closing direction of the valve in case that a vehicle is overturned.

Further, on a flange end part 5c of the upper housing 5, the peripheral part of a rubber-like elastic material diaphragm 8a of the differential pressure regulating valve 8 is mounted and is held and fixed between the above flange and a ring form flange 9a of a cap member 9 forming an operating chamber R1.

The differential pressure regulating valve 8 operates in response to a differential pressure between an inner pressure of the fuel tank 101 being transmitted through the vent part 6 and acting on the front and back faces of the diaphragm 8a and a pressure outside (atmospheric side) of the fuel tank 101 introduced into the operating chamber R1 from the open state filler tube 107 (refer to FIG. 4) via the filler line 108.

Here, the configuration of the differential pressure regulating valve 8 will be explained referring to FIG. 2 of an enlarged view of a part D1 of FIG. 1

The differential regulating valve 8 itself is constituted of a combination of a diaphragm 8a, a retainer 8b as an abutting member keeping the shape of the diaphragm by being abutted on the diaphragm 8a, and an orifice plug 8c.

Then, a projected line of a bead part (or valve body) 8d rising in a ring shape and functioning as a valve body of the differential pressure regulating valve 8 is integrally formed on a side of the diaphragm 8a, the side of which is opposing to the valve seat 5b.

Moreover, a projecting part 8e is integrally formed at the center of the diaphragm 8a and loosely fitted in a hole 8f provided on the retainer 8b, functioning as a fitting means.

The orifice plug 8c is provided with an orifice through which a small flowing flow is made to flow between the inside of the upper housing 5 communicating with the inside of the fuel tank 101 and the operating chamber R1, and is fitted by a retainer 8b. A hole 8g is provided at the part of the diaphragm 8a where the orifice plug 8c is fitted, and is engaged in a neck part 8h of the diaphragm 8c with a loose clearance.

Then, the orifice plug 8c eliminates a differential pressure between the operating chamber R1 and the inside of the fuel tank 101 within a predetermined time to maintain the closing characteristic of the differential pressure regulating valve 8 or permits to exhaust the fuel to the side of the fuel tank 101 by a small amount when the fuel L is made to flow into the operating chamber R1.

Moreover, a guide cylinder 8i is projecting to the side of the operating chamber R1, and the outside wall of the guide cylinder 8i is engaged to freely slide on the inside wall of the ring guide 9b of the cap member 9, functioning as a guide means to guide the moving direction of the retainer 8b.

The reference mark 9c is a spring for biasing the diaphragm 8a in the closing direction of the valve via the retainer 8b.

The retainer 8b moves in the same direction as the biasing direction of the spring 9c, and is also abutted on the same position of the diaphragm 8a by the guide means without lateral displacement in the figure, to keep the shape of the diaphragm.

Therefore, since the diaphragm 8a is biased by the spring 9c in the closing direction of the valve, it closes the valve seat 5b to prevent the fuel vapor G from exhausting in a state in which a differential pressure is very small between the inside of the fuel tank 101 and the operating chamber R1, and opens the valve to exhaust the fuel vapor G when the differential pressure reaches a predetermined value or higher due to fueling, etc.

Figure 3:
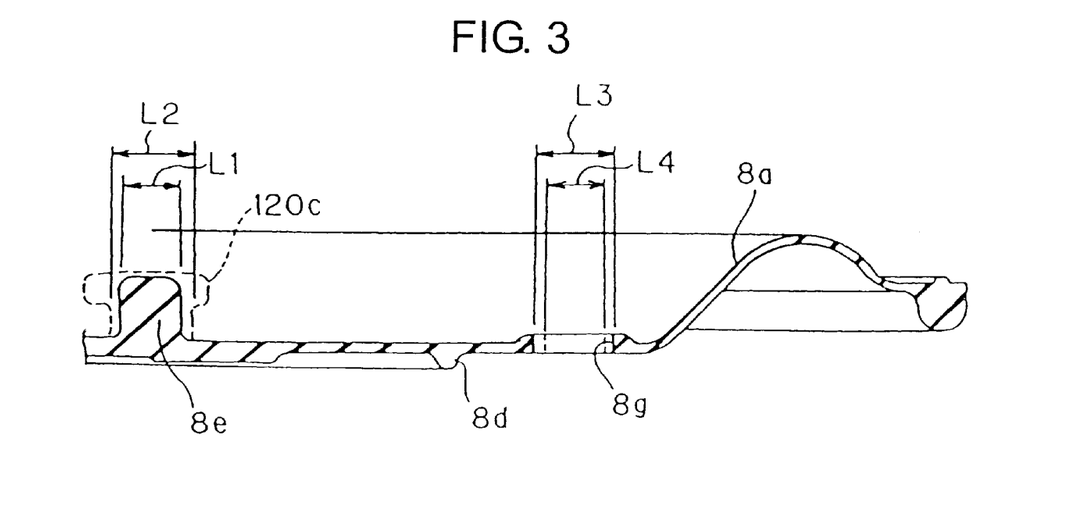
FIG. 3 is a comparison drawing of diaphragms.

FIG. 3 is a view of comparison between a single piece of the diaphragm 8a in accordance with the preferred embodiment of the present invention and a conventional one, where the broken line shows the part of the conventional diaphragm membrane.

Referring to FIG. 3, the projecting part 8e has a smaller outer diameter (L1<L2) to avoid coming into contact with the engaging hole 8f provided on the retainer 8b, and a top bulge formed on the projecting part 120c is also eliminated. The upper peripheral edge of the projecting part 8e is rounded so as to get the smooth operation for the projecting part to get into the engaging hole. The diameter of the projecting part 8e is about 2 mm, and the diameter of the engaging hole 8f is about 3.1 mm. The height of the projecting part 8e is about 2 mm.

Moreover, in the case where orifice is used in these type of device, an outer diameter of the hole 8g in which the orifice plug 8c is fitted is made larger than a conventional one (L3>L4), and an interference of the orifice plug 8c is also decreased.

Therefore, even if the diaphragm 8a and the retainer 8b are engaged with each other, it becomes possible to permit a relative movement, due to the clearance Cl, between them in the direction about perpendicular to their biased direction by the spring 9c, reduce deformation of the diaphragm 8a, and keep the flatness of the bead part 8d integrally provided on the diaphragm 8a.

Thus, it is possible to bring the closed state of the bead part (or valve body) 8d and the valve seat 5b into satisfactory intimate contact with one another, and improve the sealing performance of the differential pressure regulating valve 8 and a liquid shut-off function of the liquid shut-off valve device 1.

Next, operation of the liquid shut-off valve device 1 provided with the configuration as the above will be described. In a normal state (the term "normal state" is used as a meaning of a state allowing a vehicle to be safely used including a state with some possible tilt of the vehicle) when the fuel L is not made to flow into the float chamber 2a, the liquid shut-off valve device 1 exhausts the fuel vapor G in the fuel tank 101 from the float chamber 2a to the exhaust line 103 via the exhaust port 5a by the differential pressure regulating valve 8 opened in response to the open state float 7 and the pressure of the fuel vapor G.

When the liquid level of the fuel L rises in the fuel tank 101, the float 7 floats by its own buoyant force and the biasing force of the spring 7b and the valve body part 7a is abutted on the valve seat 6a for closing the valve. In this state, it is of course that the fuel L does not leak into the exhaust line 103, however, the valve shuts off also the gases such as air, fuel vapor G, etc. existing in the upper space of the fuel tank 101, and operates an auto-stop function of an unshown fuel gun for preventing the fuel L from being further fed to the fuel tank 101.

As described in the preferred embodiments of the present invention of the above, when the diaphragm and the abutting member are engaged with one another, it is possible to reduce small wrinkles and deformation of the diaphragm and the valve body integrally provided on the diaphragm, improve the sealing performance at the time of closing the differential pressure regulating valve, and obtain a liquid shut-off valve device having a stable operating characteristic.

What is claimed is:

1. A differential pressure regulating valve comprising;
   a diaphragm of which the peripheral part is fixedly held and which operates in response to a differential pressure between pressures applied to the front and back faces of the diaphragm,
   a valve seat disposed opposite to a center part of the diaphragm,
   a valve body which is assembled with the diaphragm in one body and meets the valve seat or parts from the same,
   an abutting member disposed in the adjacent relation and on an opposite side of said valve body of the diaphragm,
   a biasing means for biasing said diaphragm via the abutting member to bring said valve body into a closed state,
   a guide means for limiting a moving direction of the abutting member to an approximately same direction as the biased direction, and
   an engaging means for preventing said diaphragm from being distorted by allowing a relative move in a direction approximately perpendicular to the direction biased by said biasing means and for engaging said diaphragm with said abutting means.

2. A differential pressure regulating valve in accordance with claim 1, wherein said engaging means is comprised of a projecting part provided on said diaphragm and an engaging hole of said abutting member in which the projecting part is loosely engaged.

3. A liquid shut-off valve device comprising;

an exhaust path which is arranged on a top part of a sealed container containing liquid and through which gas in the sealed container is exhausted, a float valve which is moved by a buoyant force of the liquid in the sealed container and opens/closes said exhaust path, and a differential pressure regulating valve which opens/closes said exhaust path in response to a differential pressure between the sealed container and an operation chamber into which a pressure outside of the sealed container is introduced, comprising, a diaphragm which is fixedly held around its peripheral part and operates in response to a differential pressure between the front and back surfaces thereof, a valve seat placed opposite to a center part of the diaphragm, a valve body which is assembled with the diaphragm in one body and meets the valve seat or parts from the same, an abutting member arranged in the adjacent relation and on an opposite side of the valve body of the diaphragm, a biasing means for biasing the diaphragm via the abutting member to bring the valve body into a closed state, a guide means for limiting a moving direction of the abutting member to an approximately same direction as the biased direction, and an engaging means which reduces deformations of the diaphragm by allowing a relative move in a direction approximately perpendicular to the direction biased by the biasing means and engages the diaphragm with the abutting means.

4. A liquid shut-off valve device in accordance with claim 3, wherein the engaging means is comprised of a projecting part provided with the diaphragm and an engaging hole of the abutting member in which the projecting part is loosely engaged.

5. A liquid shut-off valve device in accordance with claim 3, wherein said engaging means is an orifice plug provided with the diaphragm.

* * * * *